United States Patent
Kussmaul et al.

(10) Patent No.: US 11,244,007 B2
(45) Date of Patent: Feb. 8, 2022

(54) AUTOMATIC ADAPTION OF A SEARCH CONFIGURATION

(71) Applicant: International Business Machines Corporation, Armonk, NY (US)

(72) Inventors: Timo Kussmaul, Boeblingen (DE); Uwe K. Hansmann, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 541 days.

(21) Appl. No.: 16/384,973

(22) Filed: Apr. 16, 2019

(65) Prior Publication Data

US 2020/0334297 A1    Oct. 22, 2020

(51) Int. Cl.
    *G06F 16/00*    (2019.01)
    *G06F 16/903*    (2019.01)
    *G06N 7/00*    (2006.01)
    *G06F 16/9035*    (2019.01)

(52) U.S. Cl.
    CPC .... *G06F 16/90335* (2019.01); *G06F 16/9035* (2019.01); *G06N 7/005* (2013.01)

(58) Field of Classification Search
    CPC ........... G06F 16/90335; G06F 16/9035; G06F 16/285; G06N 7/005; G06N 20/00
    See application file for complete search history.

(56) References Cited

U.S. PATENT DOCUMENTS

| | | | |
|---|---|---|---|
| 7,689,580 B2 | 3/2010 | Wang | |
| 7,895,181 B2 * | 2/2011 | Shaw | G06F 16/951 707/706 |
| 8,793,573 B2 | 7/2014 | Beckmann | |
| 8,832,076 B2 * | 9/2014 | Gutlapalli | G06F 16/90 707/715 |
| 9,098,497 B1 | 8/2015 | Brette | |
| 9,213,749 B1 | 12/2015 | Collins | |
| 9,361,317 B2 | 6/2016 | Lightner | |
| 9,563,621 B2 | 2/2017 | Halme | |
| 9,697,016 B2 | 7/2017 | Jacob | |

(Continued)

FOREIGN PATENT DOCUMENTS

| | | | |
|---|---|---|---|
| JP | 2004112318 A | 4/2004 | |
| JP | 4042100 B2 | 2/2008 | |
| WO | 0119017 A1 | 3/2001 | |

OTHER PUBLICATIONS

"Amazon Cloudsearch", 7 pages, Jul. 3, 2018, copyright 2018, Amazon Web Services, <https://aws.amazon.com/cloudsearch/>.

(Continued)

*Primary Examiner* — Debbie M Le
(74) *Attorney, Agent, or Firm* — Alexander G. Jochym

(57) ABSTRACT

The invention relates to a method for automatically adapting a search configuration of a search engine of a search service based on repeatedly occurring events. The method comprises monitoring configuration changes applied to the search configuration, detecting events using time series and determining associations between the configuration changes applied and events detected. For the events, a likelihood of an occurrence of the respective event within a predefined time frame is calculated and, if the likelihood exceeds a predefined threshold, the search configuration is automatically adapted in anticipation of the respective event according to configuration changes associated with the event.

20 Claims, 6 Drawing Sheets

(56) References Cited

U.S. PATENT DOCUMENTS

| | | |
|---|---|---|
| 9,697,258 B2 | 7/2017 | Barton |
| 9,734,518 B2 | 8/2017 | Suleman |
| 2008/0208808 A1* | 8/2008 | Sue .................... G06F 16/951 |
| 2012/0078874 A1 | 3/2012 | Gonzalez |
| 2014/0035887 A1 | 2/2014 | Jong-Hae |
| 2015/0309698 A1 | 10/2015 | Senderek |
| 2017/0169111 A1 | 6/2017 | Baum |
| 2017/0201523 A1 | 7/2017 | Palmer |
| 2017/0220605 A1 | 8/2017 | Nivala |
| 2017/0357725 A1 | 12/2017 | Hornkvist |
| 2018/0121556 A1 | 5/2018 | Badros |

OTHER PUBLICATIONS

"Autoregressive model", From Wikipedia, the free encyclopedia, Last edited Mar. 28, 2019, <https://en.wikipedia.org/wiki/Autoregressive_model>.

"Bayes' theorem", From Wikipedia, the free encyclopedia, Last edited on Mar. 16, 2019, <https://en.wikipedia.org/wiki/Bayes'_theorem>.

"Bayesian inference", From Wikipedia, the free encyclopedia, Last edited on Mar. 29, 2019, <https://en.wikipedia.org/wiki/Bayesian_inference>.

"Bayesian probability", From Wikipedia, the free encyclopedia, Last edited on Feb. 23, 2019, <https://www/en.wikipedia.org/wiki/Bayesian_probability>.

"Bayesian statistics", From Wikipedia, the free encyclopedia. Last edited on Apr. 12, 2019, 4 pages, https://en.wikipedia.org/wiki/Bayesian_statistics#cite_note-bda-1>.

"Conditional probability", From Wikipedia, the free encyclopedia, Last edited on Mar. 18, 2019, <https://en.wikipedia.org/wiki/Conditional_probability>.

"Errors and residuals", From Wikipedia, the free encyclopedia, last edited Dec. 28, 2018, <www.https://en.wikipedia.org/wiki/Erros_and_residuals>.

"Event (probability theory)", From Wikipedia, the free encyclopedia, Last edited on Mar. 25, 2019, <https://en.wikipedia.org/wiki/Event_(probability_theory)>.

"Frequentist probability", From Wikipedia, the free encyclopedia, Last edited on Mar. 14, 2019, <https://en.wikipedia.org/wiki/Frequentist_probability>.

"George E.P. Box", From Wikipedia, the free encyclopedia, Last edited on Mar. 29, 2019, <www.https://en.wikipedia.org/wiki/George_E._P._Box>.

"Gwilym Jenkins", From Wikipedia, the free encyclopedia, Last edited on Jan. 12, 2017, <www.https://en.wikipedia.org/wiki/Gwilym_Jenkins>.

"Headless Crawling", 2 pages, printed Jul. 3, 2018, copyright 2017 Ryte, <https://en.ryte.com/wiki/Headless_Crawling>.

"JaSpell::Java Spelling Checking Package, SourceForge", 2004 copyright Bruno Marins—XLDB Group, Apr. 12, 2019, 1 page, <http://jaspell.sourceforge.net/>.

"Limit of a sequence", From Wikipedia, the free encyclopedia, Last edited on Feb. 6, 2019, <https://en.wikipedia.org/wiki/Limit_of_a_sequence>.

"Linear combination", From Wikipedia, the free encyclopedia, Last edited Oct. 22, 2018, <https://en.wikipedia.org/wiki/Linear_combination>.

"Moving-average model", From Wikipedia, the free encyclopedia, Last edited on Dec. 8, 2018, <https://en.wikipedia.org/wiki/Moving-average-model>.

"Open-Source Content Management Systems Lack Security", 5 pages, Aug. 25, 2018, <https://expert.services/blog/managing-your-website-security/hacking-open-source-cms.html>.

"Peter Whittle (mathematician)", From Wikipedia, the free encyclopedia, Last Edited on Feb. 27, 2019, <https://en.wikipedia.org/wiki/Peter_Whittle_(mathematician)>.

"Probability distribution", From Wikipedia, the free encyclopedia, Last edited on Mar. 29, 2019, <https://en.wikipedia.org/wiki/Probability_distribution>.

"Probability interpretations", From Wikipedia, the free encyclopedia, Last edited on Feb. 28, 2019, <https://en.wikipedia.org/wiki/Probability_interpretations>.

"Probability", From Wikipedia, the free encyclopedia, Last Edited on Mar. 18, 2019, <https://en.wikipedia.org/wiki/Probability>.

"Stationary process", From Wikipedia, the free encyclopedia, Last edited on Mar. 15, 2019, <https://en.wikipedia.org/wiki/Stationary_process>.

"Statistical model", From Wikipedia, the free encyclopedia, Last edited on Apr. 1, 2019, <https://en.wikipedia.org/wiki/Statistical_model>.

"Statistics", From Wikipedia, the free encyclopedia, Last edited on Mar. 29, 2019, <https://en.wikipedia.org/wiki/Statistics>.

"The making of ERS 2.0—Getting Started with Cloud CMS", 17 pages, 2017, The Headless Meet Cloud CMS, <https://www.google.com/url?sa=t&rct=j&q=&esrc=s&source=web&cd=1&ved=0ahUKEwj-olSd85bcAhWDfisKHYqbBa4QFggnMAAA&url=https%3A%2F%2Fwww.cloudcms.com%2Fdownloads%2Fpdfs%2FThe_Making_of_ERS.pdf&usg=AOvVaw1A17jUjRveK-5zAixyNjus>.

"Time series", From Wikipedia, the free encyclopedia, Last edited on Mar. 13, 2019, <https://en.wikipedia.org/wiki/Time_series>.

Adhikari, et al., "An Introductory Study on Time Series Modeling and Forecasting", 67 pages, <https://arxiv.org/ftp/arxiv/papers/1302/1302.6613.pdf>.

Cleveland, et al., "STL: A Seasonal-Trend Decomposition Procedure Based on Loess, Journal of Official Statistics", vol. 6, No. 1, 1990, pp. 3-73, <https://www.wessa.net/download.stl.pdf>.

Exalead, "Search-Based Applications (SBAs)", Exalead Solutions Brief: Search-Based Applications (SBAs), v 1.1 © 2010 Exalead, pp. 1-8.

Kauffman, "A Better Authoring Experience for Headless CMS'S", Mar. 7, 2018, pp. 1-4, <https://www.bloomreach.com/en/blog/2018/03/a-better-authoring-experience-for-headless-cms%E2%80%99s.html>.

Mell et al., "The NIST Definition of Cloud Computing", Recommendations of the National Institute of Standards and Technology, Special Publication 800-145, Sep. 2011, 7 pages.

Rack Blogger, "Content Management System Comparison: Performance Optimization", Jan. 20, 2011, The Official Rackspace Blog, 3 pages, <https://blog.rackspace.com/content_management_system_comparison_performance_optimization>.

Whittle, Peter, "Hypothesis testing in time series analysis", Uppsala, Almqvist & Wiksells boktr. 1951, 120 pages, <https://www.worldcat.org/title/hypothesis-testing-in-time-series-analysis/oclc/22153644>.

Kussmaul, "Improved Navigation Paths Between Content Items", U.S. Appl. No. 16/384,977, filed Apr. 16, 2019.

Kussmaul, et al., "Automatic Check of Search Configuration Changes", U.S. Appl. No. 16/384,974, filed Apr. 16, 2019.

Kussmaul, et al., "Managing Search Queries of a Search Service", U.S. Appl. No. 16/384,979, filed Apr. 16, 2019.

Kussmaul, et al., "Personalizing a Search of a Search Service", U.S. Appl. No. 16/384,981, filed Apr. 16, 2019.

Kussmaul, et al., "Preventing Search Fraud", U.S. Appl. No. 16/384,978, filed Apr. 16, 2019.

Kussmaul, et al., "User-Driven Adaptation of Rankings of Navigation Elements", U.S. Appl. No. 16/384,975, filed Apr. 16, 2019.

List of IBM Patents or Patent Applications Treated as Related, Appendix P, Filed Herewith.

* cited by examiner

AUTOMATIC ADAPTION OF A SEARCH CONFIGURATION

BACKGROUND

The present disclosure relates to the field of electronic data processing and, more specifically, to automatically adapting of a search configuration of a search engine of a search service.

In order to handle large data collections search services may be used. Such search services enable retrieving and presenting information from those large data collections in response to queries executed on the data collections. The data processing executed by a search service is defined by a search configuration. In order to adjust a search service to specific requirements or preferences of different users, the search service may allow modifying search configurations. However, modifying search configurations may require state of the art knowledge of the search engine used by the search service. Without that knowledge, there may be a risk for misconfigurations resulting from modifications implemented by users, which may lead to performance degradation and/or system misbehavior, when executing searches.

SUMMARY

Various embodiments provide a method for automatically adapting a search configuration of a search engine of a search service as well as a computer program product and a computer system for executing the method as described by the subject matter of the independent claims. Advantageous embodiments are described in the dependent claims. Embodiments of the present invention can be freely combined with each other if they are not mutually exclusive.

In one aspect, the invention relates to a method for automatically adapting a search configuration of a search engine of a search service based on repeatedly occurring events. The search configuration is represented by a set of one or more configuration parameters. The method comprises monitoring one or more configuration changes applied to the search configuration. Each configuration change is defined by a set of one or more configuration parameter changes applied to one or more of the configuration parameters of the set of configuration parameters. A set of one or more time series of a set of one or more performance indicators of the search service is generated using the search configuration. The generating of the set of time series comprises monitoring the set of performance indicators. A set of one or more events is detected using the set of time series of the set of performance indicators. Each event is assigned to a time frame. A set of one or more associations is determined. Each association is an association between an event of the set of events detected for the search configuration and a configuration change of the one or more configuration changes monitored for the search configuration. For each event of the set of events a first likelihood of an occurrence of the respective event within a first predefined time frame is calculated and, if the first likelihood exceeds a predefined threshold, at the start of the first predefined time frame in anticipation of the respective event the search configuration is automatically adapted using the set of configuration parameter changes of the configuration change, which is associated with the respective event.

In a further aspect, the invention relates to a computer program product comprising a non-volatile computer-readable storage medium having computer-readable program code embodied therewith for automatically adapting a search configuration of a search engine of a search service based on periodically occurring events. The search configuration is represented by a set of one or more configuration parameters. The automatic adapting comprises monitoring one or more configuration changes applied to the search configuration. Each configuration change is defined by a set of one or more configuration parameter changes applied to one or more of the configuration parameters of the set of configuration parameters. A set of one or more time series of a set of one or more performance indicators of the search service is generated using the search configuration. The generating of the set of time series comprises monitoring the set of performance indicators. A set of one or more events is detected using the set of time series of the set of performance indicators. Each event is assigned to a time frame. A set of one or more associations is determined. Each association is an association between an event of the set of events detected for the search configuration and a configuration change of the one or more configuration changes monitored for the search configuration. For each event of the set of events a first likelihood of an occurrence of the respective event within a first predefined time frame is calculated and, if the first likelihood exceeds a predefined threshold, at the start of the first predefined time frame in anticipation of the respective event the search configuration is automatically adapted using the set of configuration parameter changes of the configuration change, which is associated with the respective event.

In a further aspect, the invention relates to a computer system for automatically adapting a search configuration of a search engine of a search service based on periodically occurring events. The search configuration is represented by a set of one or more configuration parameters. The computer system comprises a processor and a memory storing machine-executable program instructions. Executing the program instructions by the processor causes the processor to control the computer system to monitor one or more configuration changes applied to the search configuration. Each configuration change is defined by a set of one or more configuration parameter changes applied to one or more of the configuration parameters of the set of configuration parameters. A set of one or more time series of a set of one or more performance indicators of the search service is generated using the search configuration. The generating of the set of time series comprises monitoring the set of performance indicators. A set of one or more events is detected using the set of time series of the set of performance indicators. Each event is assigned to a time frame. A set of one or more associations is determined. Each association is an association between an event of the set of events detected for the search configuration and a configuration change of the one or more configuration changes monitored for the search configuration. For each event of the set of events a first likelihood of an occurrence of the respective event within a first predefined time frame is calculated and, if the first likelihood exceeds a predefined threshold, at the start of the first predefined time frame in anticipation of the respective event the search configuration is automatically adapted using the set of configuration parameter changes of the configuration change, which is associated with the respective event.

BRIEF DESCRIPTION OF THE SEVERAL VIEWS OF THE DRAWINGS

In the following, embodiments of the invention are explained in greater detail, by way of example only, making reference to the drawings in which.

DETAILED DESCRIPTION

Figure 1:
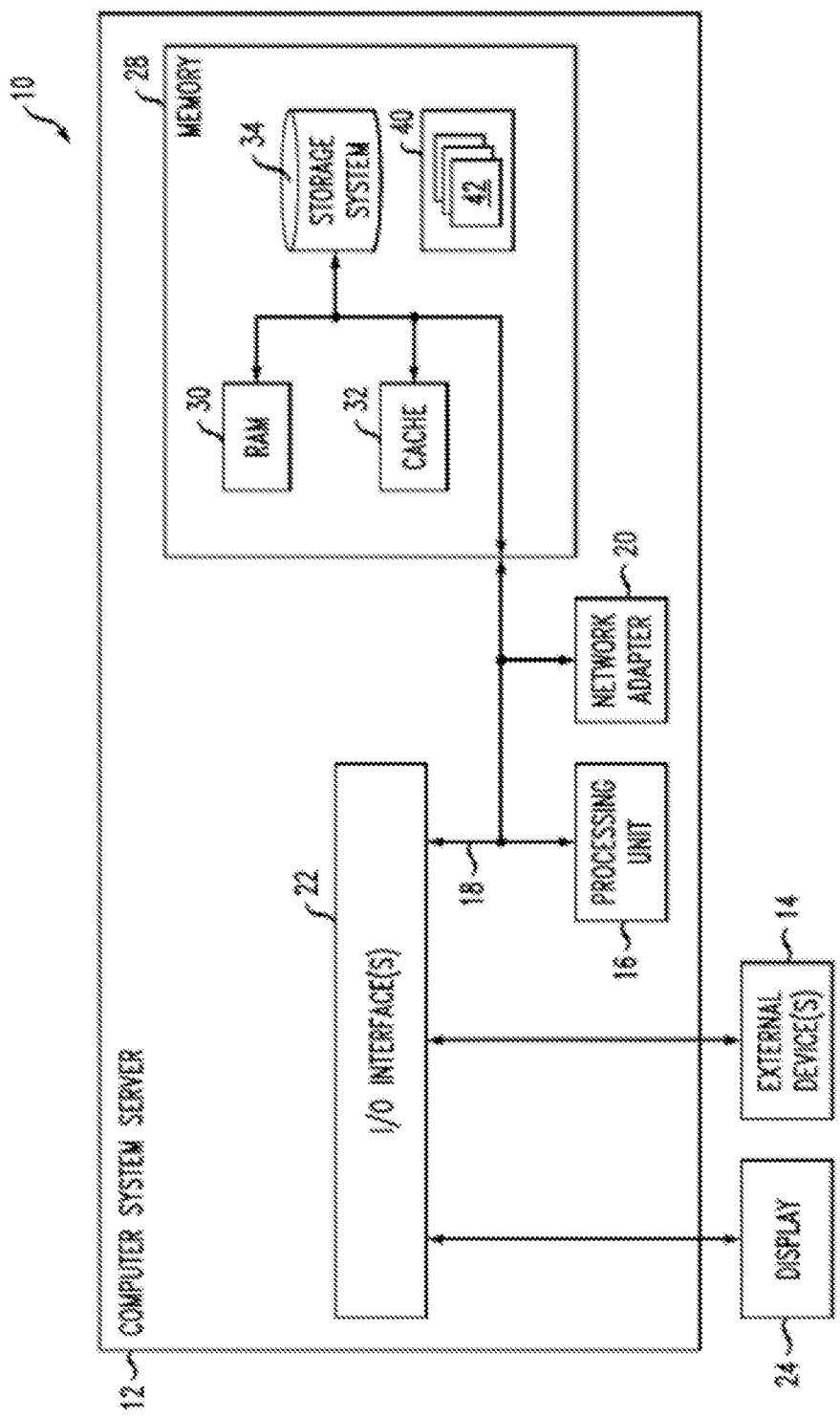
FIG. 1 depicts a schematic diagram illustrating an exemplary cloud computing node according to an embodiment.

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments may have the beneficial effect of relating configuration changes applied to a search configuration with events. The configuration parameters may define the processing of documents for indexing or searching as well as the behavior of the search engine. Events are detected using time series of performance indicators, i.e. events are represented by characteristic evolution patterns of values or performance indicators over time. Thus, each event is assigned to a time frame within which the same occurs. An event may for example be represented by a phase of high load of a search engine due to a high customer demand, i.e. high search intensity, at a specific time of the year, of the month, of the week, or of the day. In order to handle the high load, the configuration of the search engine may be adapted. The respective event represented by the high load may be associated with a configuration change applied to the search configuration at the time of the respective event.

A predefined time frame, a likelihood of an occurrence of the respective event is calculated. If the first likelihood exceeds a predefined threshold, the respective configuration change is scheduled for an automatically adapting the search configuration in anticipation of the respective event. Thus, at the start of the predefined time frame, the respective configuration change is implemented, i.e. the configuration change is used for adapting the search configuration, thereby preparing the search service for the respective event which is expected to occur.

By using configuration changes which have been applied successfully in the past, the risk of misconfigurations resulting from inadequate configuration changes may be minimized. Thus, errors during indexing and querying, insufficient search quality, performance degradation and/or system misbehavior, like e.g. memory mismanagement, may be avoided.

The search configuration may provide configuration parameters which are used by the search service, i.e. the search engine of the search service, for defining indexing, querying, ranking behavior and/or data management and memory management aspects of the search service. For example, the search configuration may define a schema, i.e. a data structure, for documents of a collection of documents to be searched, field types, analyzers and tokenizers to be used for each field type during indexing and querying, configuration parameters for the respective analyzers and tokenizers, like e.g. definitions of which synonyms to use for a synonym filter, and/or configuration parameters for query and request handlers, like e.g. definitions of which kind of queries, index uploads, etc. are supported. A search service may allow tenants to define or change a tenant specific search configuration. However, this requires state of the art knowledge of the search engine used. Thus, there may be a potential for misconfigurations resulting from definitions and/or changes implemented by a tenant, leading to errors during indexing and querying, insufficient search quality, performance degradation and/or system misbehavior, like e.g. memory mismanagement.

Embodiments may have the beneficial effect of enabling automatic adaptions of search configurations based on repeatedly occurring events. The automatic adaptions may be implemented using a method for analyzing search configuration changes, detecting configuration changes related to events, and automatically performing configuration changes in anticipation of future events. For example, the search engine may be extended by a configuration adaptation (CA) component. This component, e.g. a software component, may provide functionality for analyzing search configuration changes, detecting configuration changes relating to events, and automatically performing configuration changes in anticipation of events.

A search service is a service enabling discovering, crawling, transforming and/or storing information, e.g. text-based information, for retrieval and presentation in response to a query. A search service may comprise one or more search configuration, each search configuration being represented by a set of one or more configuration parameters defining a configuration of the search service. A search configuration may for example be assigned to a tenant. Furthermore, a search service may comprise a search façade, a search engine as well as one or more search indexes. A search façade, also referred to as a search interface, is configured for receiving requests providing search queries and evaluating access rights. Furthermore, a search façade may ensure that individual tenants only see their own data, i.e. data which is assigned to them and/or for which they have access rights. A search engine is an information retrieval software program configured for discovering, crawling, transforming and/or storing information for retrieval and presentation in response to a query. The search engine may comprise a crawler, indexer and/or a database. A crawler may be configured for traversing websites to retrieve their content, e.g. as documents, to store them in a search collection, i.e. a collection of data, in order to provide a collection of documents to be searched. For deriving the documents to be stored in the search collection, a crawler may e.g. deconstructing datasets provided by the websites, like e.g. document texts, and/or assigning surrogates for storage in a search index. The indexer may be configured for generating and amending search indexes. The search index may be stored in a database assigned to the search engine. A search engine may furthermore store images, link data and/or metadata of the data, e.g. documents, comprised by the search collections. A search engine may for example execute operations required to index documents and perform text-based searches using the indexed documents. A search engine may for example be configured as a web search engine for searching information on the world wide web or as a database search engine configured for searching information on a database. A search index, also referred to as a search collection, is an index generated for a collection of data, e.g. documents, to be searched. A search index may be configured for and assigned to an individual tenant. Search engine indexing refers to collecting, parsing, and storing data from a collection of data to be searched in order to facilitate fast and accurate information retrieval.

A search service may for example be provided in form of a cloud service. Such a cloud-based service may be configured for serving multiple tenants with one deployment. A tenant is a group of users, e.g. a company, who share a common access with specific privileges to the search engine. Data to be searched may be defined as tenant specific data with access rights only for the respective tenant to which it is assigned. The search service may ensure that tenant specific data is isolated from other tenants. The search service may comprise a plurality of search configurations, each search configuration assigned to an individual tenant. Service requests received from clients may contain a tenant id of the tenant which is associated with a request. The respective tenant id may allow the search service and/or the infrastructure providing the search service to identify a search configuration assigned to the respective tenant and to be used for processing the received request.

A search service may provide functionality for searching in unstructured data, like e.g. text documents. For this purpose, a search service provides functionality to create a search index by indexing content items, i.e. data to be searched, like e.g. text documents. A search index may contain a representation of a data content to be searched, in a representation which is suited, e.g. improved, for processing by the search service. The search service may provide an application programming interface API for indexing content items, which makes the respective content items searchable by the search service. Further the search service may provide a query API allowing a client, e.g. another service or an application, to issue a search query. A search query may contain a set of query parameters specifying search criteria for searching content items, like e.g. a set of search terms. The search service may process the query by selecting and ranking a set of content items according to a search query. The ranking may determine a scoring or an order of the respective content items relative to the search query, which represents for each of the content items a level of relevance in relation to the respective search query. A search query may also contain parameters for controlling the ranking, like e.g. a ranking query, a boost query and/or a boost function. Furthermore or alternatively, a search service may automatically select one or more heuristics and/or parameters for a search ranking. A search ranking may for example be based on statistics about the search collection and the search terms used for a search. Furthermore, the search ranking may be based on statistics of an occurrence of search terms in specific content items.

For a ranking, e.g. the tf-idf method (term frequency-inverse document frequency) may be used, which is a numerical statistic intended to reflect an importance or relevance of a word for a document in a search collection. Tf-idf values may be used in search service as weighting factors in ranking a document's relevancy relative to a given search query. An tf-idf value increases proportionally to the number of times a word appears in a document and is offset by the frequency of appearance of the word in the search collection.

A search service may manage multiple search indexes, e.g. assigned to multiple tenants. Thus, a search service may be used in a multi-tenant environment e.g. by creating a separate search index for each tenant. In this case, search client services may be required to correctly select the correct index to use for search requests depending on a tenant context.

A search service may be designed to provide efficiently full text search results. Documents to be searched may be provided to a search service, which analyzes the documents and puts the relevant data in a search index. Search indexes may also be used to separate data. In modern multi-tenant content management systems, like e.g. Watson® Content Hub, search collections are used to separate data from different tenants. Watson® Content Hub is a cloud-based content management system (CMS) allowing to content-enable applications, e.g. mobile apps, single-page applications, billboards, embedded devices, etc.

A search index may be associated with a specific search configuration, consisting of multiple configuration parameters defining settings which control search functionality, behavior and e.g. the structure of the content items in a search index. Search configuration parameters may be updatable and/or changeable via a search service API or by uploading a set of configuration parameter changes, e.g. in form of one or more configuration files, to the search service, a file system or a persistent storage the search service is using.

A search index may be configured according to a search index individual index schema. The index schema may define how to build an index from input documents. Each index schema may comprise one or more fields. Fields of an index schema may comprise different types of data. A name field, for example, may comprise text, i.e. character data, size field may comprise a floating-point number.

A search service may further be configured to collect statistics on a search index and its use. For example, a search service may enable querying top searched terms for a field of choice of a search index. A search service may further provide search suggestions and/or a spellchecking. Search suggestions and/or a spellchecking provided by the search service may comprise a definition for an implementation of a lookup and/or a dictionary. Additionally, a search service may provide a request handler for processing search suggestion/spellchecking requests. A search configuration may therefor also comprise configuration parameters for configuring the respective request handler.

A time series is a series of data values, e.g. values of a performance indicator, indexed in time order providing a sequence of discrete-time data. For example, the time series may be a sequence data values determined at successive equally or unequally spaced points in time.

Time series analysis provides methods for analyzing time series data in order to extract meaningful statistics and other characteristics of the data comprised by the time series. Time series forecasting may be used to predict future data values based on previously observed data values.

A time series analysis may use for example frequency-domain methods or time-domain methods. Frequency-domain methods may e.g. include spectral analysis and wavelet analysis, may e.g. include auto-correlation and cross-correlation analysis. Furthermore, the time series analysis techniques may comprise parametric and non-parametric methods. Parametric approaches assume that the underlying stationary stochastic process has a certain structure which can be described using a small number of parameters, e.g. using an autoregressive or moving average model. Parametric approaches aim to estimate the respective parameters of the model describing the stochastic process. Non-parametric approaches may estimate the covariance or the spectrum of the process without assuming any particular structure for the process.

For performing a time series analysis, e.g., the time series analysis algorithm STL (seasonal-trend decomposition procedure based on loess) may be used. The STL algorithm comprises a decomposition of a time series into three components, i.e. i) a trend component, ii) a seasonal component, and iii) a remainder. The trend component describes whether the data generally rises or falls during the observation period. The seasonal component describes the cyclical aspect of the data, while the remainder describes data that cannot be explained by the previous two components.

For performing a time series forecasting, there is a large number of suitable time series forecasting models which may be used. For example, a time series forecasting model based on vector machines, an artificial neural network or a stochastic model may be used. According to embodiments an autoregressive-moving-average model, which is based on stochastics, is used.

According to embodiments, the method further comprises at the end of the first predefined time frame reverting each of the configuration changes implemented by adapting the search configuration with the sets of configuration parameter changes used at the start of the first predefined time frame. Embodiments may have the beneficial effect that after the expected event, the search configuration is set back to its initial state before the start of the predefined time frame. Thus, event specific modification of the search configuration may be implemented exclusively for the time frame to which the respective event is assigned.

According to embodiments, the method further comprises for each event of the set of events calculating a second likelihood of an occurrence of the respective event within a second predefined time frame. The second predefined time frame follows the first predefined time frame, and, if the second likelihood exceeds the predefined threshold, at the end of the first predefined time frame in anticipation of the respective event the search configuration is automatically adapted using the set of configuration parameter changes of the configuration change, which is associated with the respective event.

Embodiments may have the beneficial effect of implementing a configuration change at the end of the first predefined time frame in anticipation of an event which is expected to occur next in the second predefined time frame following the first predefined time frame. Thus, rather than returning to the initial state before the start of the first predefined time frame, the search configuration may be changed further, in order to be adjusted to the event expected to occur next in the second predefined time frame.

According to embodiments, the predefined threshold is a threshold predefined commonly for all events. Predefining a common threshold for all events may help standardize the evaluation of likelihoods of occurrence of different events. According to embodiments, the predefined threshold is an event specific threshold. Embodiments may have the beneficial effect that the threshold may depend on the event and/or the set of configuration parameter changes associated with the respective event. For example, the threshold may be predefined the higher the larger the number of configuration parameter changes comprised by the respective set of configuration parameter changes is and/or the more extensive the effects of the configuration parameter changes are. According to embodiments, configuration parameters of the search configuration which are allowed to be changed may be classified depending on their relevance for search service. The threshold may depend on the classes of the configuration parameters to be changed. The higher the relevance assigned to the respective classes, the higher the threshold may be defined.

According to embodiments, the detecting of the set of events comprises for each time series of the set of time series determining one or more phases of the respective time series. The one or more determined time series phases are clustered and the one or more clustered time series phases are classified. Embodiments may have the beneficial effect of detecting efficiently events using times series of performance indicators. An event is characterized by a specific pattern of performance indicators in time. By clustering and classifying time series phases such a pattern may be determined and the events represented may be identified. A cluster or combination of clusters to which the time series phases are grouped or assigned is classified, i.e. a class or type of event is identified which is represented by the respective cluster or combination of clusters. For example, a phase of high load may be classified as an event representing a high customer search demand before a specific time of the year.

A clustering refers to the task of grouping a set of data objects, e.g. phases of the time series, in such a way that data objects in the same group, i.e. in the same cluster, are more similar according to one or more criteria to each other than to those data objects in clusters. A clustering may be implemented using various algorithms. The clustering may e.g. be a connectivity-based clustering, also known as hierarchical clustering, a centroid-based clustering, like e.g. k-means clustering, a distribution-based clustering, like e.g. Gaussian mixture model clustering, or a density-based clustering. Thus, the clustering may e.g. be based on distances between the data objects in a specific representation of the respective data objects, dense areas of the data space, intervals or particular statistical distributions.

The clustering may be referred to as a type of unsupervised learning. Unsupervised learning refers to a branch of machine learning that learns from test data that has not been labeled, clustered or classified. Rather than responding to feedback, unsupervised learning identifies commonalities in data provided and reacts based on a detected presence or absence of the respective commonalities in each new dataset.

Classification refers to the task of identifying to which of a set of classes or categories a data object or set of data objects belongs. Classification is an example of pattern recognition. Regarding the clustered time series phases, the respective clusters are classified into events or types of events, i.e. it is determined which type of event one or more clusters of time series phases resulting from the clustering are representing. A phase of high load on the search engine may for example be classified into an event representing the high customer demand at a certain time of the year. The classification may be implemented as an instance of supervised learning, i.e. a learning where a training set of correctly classified data objects, e.g. clusters of time series phases, is available. Supervised learning refers to the machine learning task of learning a function that maps an input, e.g. one or more clusters of time series phases, to an output, e.g. one or more types of events, based on example input-output pairs. The function may be inferred from labeled training data consisting of a set of training examples. Each training example may comprise a pair consisting of an input data and a desired output data. Thus, a supervised learning algorithm analyzes the training data and produces an inferred function, which may be used for mapping new input data. An algorithm implementing a classification, i.e. implementing a mathematical function for mapping input data to output data, may be referred to as classifier.

According to embodiments, the detecting of the one or more events comprises using an autoregressive-moving-average model. Embodiments may have the beneficial effect that the autoregressive-moving-average model provides an efficient and effective approach for detecting events. Autoregressive-moving-average (ARMA) models provide a parsimonious description of a weakly stationary stochastic process in terms of two polynomials. A first polynomial for an autoregression (AR) and a second polynomial for a moving average (MA). Given a time series of data $X_t$, the ARMA model may be used for understanding and/or predicting future data values in the respective time series. The AR part of an ARMA-model comprises regressing a variable on its own past values. The MA part of an ARMA-model involves modeling an error term as a linear combination of error terms occurring contemporaneously and at various times in the past. The resulting model is usually referred to as the ARMA(p,q) model with p being the order of the AR part and q being the order of the MA part.

According to embodiments, the calculating the first likelihood comprises using Bayesian statistics. Embodiments may have the beneficial effect that Bayesian statistics provide an efficient and effective approach for calculating the respective likelihoods. Bayesian statistics refers to a theory in the field of statistics based on the Bayesian interpretation of probability, i.e. probability is considered as an expression of a degree of belief in an event. The respective degree of belief may be based on prior knowledge about the event, such as the results of monitoring the event in the past in case of a repeatedly occurring event. Bayesian statistical methods use Bayes' theorem to compute and update probabilities after obtaining new data. Bayes' theorem describes a conditional probability of an event based on data as well as prior information about the event and/or conditions related to the event.

According to embodiments, the configuration parameters define one or more of the following executed by the search engine: an indexing, a querying, a ranking, a data management and a memory management. Embodiments may have the beneficial effect that by changing the configuration parameters the indexing, querying, ranking, as well as the data management and/or the memory management of the search service may be adjusted to s specific event expected to occur during a predefined time frame. In case the event occurs as expected, the search service is optimized to handle the respective event due to the respective change of the configuration parameters.

According to embodiments, the set of performance indicators comprise indicators for one or more of the following features of the search service using the search configuration: a response-time, an error rate, a memory consumption and a CPU consumption. Embodiments may have the beneficial effect of defining the events in terms of performance indicators of the search service, like e.g. response-time, error rate, memory consumption and CPU consumption. Improving these performance indicators, preventing these performance indicators from degrading or restricting a degrading of these performance indicators may efficiently be achieved by implementing search configuration changes known from previous occurrences of the respective events.

A search service may consume system resources depending on the number of search collections the search services needs to manage. The larger the number of search collections, the larger the consume of system resources may be. System resources may comprise system memory, CPU cycles, space required for persistent data storage with a dependency on the number of search collections available. System memory used may comprise a search collection specific caching. Over average CPU cycles may require updating search collections. Persistent data storage may depend on factors like e.g. the amount of metadata, size of a vocabulary and/or occurrences of individual terms spread over indexed documents.

According to embodiments, the method further comprises providing one or more additional search configurations of the search engine. Each additional search configuration is represented by a set of one or more additional configuration parameters. For each of the additional search configurations one or more additional configuration changes applied to the respective additional search configuration are monitored. Each additional configuration change is defined by a set of one or more additional configuration parameter changes applied to one or more of the additional configuration parameters of the set of additional configuration parameters representing the respective additional search configuration. For each of the additional search configurations a set of one or more additional time series of the set of performance indicators of the search service is generated using the respective additional search configuration. The generating of the set of additional time series comprises monitoring the set of performance indicators. For each of the additional search configurations a set of one or more additional events is detected using the set of additional time series of the set of performance indicators of the search service using the respective additional search configuration. Each additional event is assigned to a time frame. For each of the additional search configurations as set of one or more additional associations is determined. Each additional association is an association between an additional event of the set of additional events detected for the respective additional search configuration and an additional configuration change of the set of additional configuration changes monitored for the respective additional search configuration. For each of the additional events of the set of additional events a third likelihood of an occurrence of the respective event within a third predefined time frame is calculated and, if the third likelihood exceeds the predefined threshold, at the start of the third predefined time frame in anticipation of the respective additional event the search configuration is automatically adapted using the set of additional configuration parameter changes of the additional configuration change, which is associated with the respective additional event.

Embodiments may have the beneficial effect that search configuration changes used for a different search configuration, e.g. a search configuration of a different tenant, may be used to improve a given search configuration for handling an event expected to occur based on probability. Search configuration changes taken into account for an adapting a search configuration may not be limited to search configuration changes applied to this specific search configuration in the past, but search configuration changes applied to additional search configurations may be included.

According to embodiments, the third predefined time frame is identical with the first predefined time frame. Embodiments may have the beneficial effect that search configuration changes applied to different search configurations in the past may simultaneously be applied to improve the search configuration during the same predefined time frame.

According to embodiments, the third predefined time frame is different from the first predefined time frame. Embodiments may have the beneficial effect that different search configuration changes applied to different search configurations in the past may be used to improve the search configuration during different predefined time frames.

According to embodiments, the search configuration and the additional search configurations are each assigned to a different tenant. Embodiments may have the beneficial effect that search configuration changes from different search configurations may be used and/or combined. According to embodiments, the additional search configurations is assigned to the same tenant as the search configuration.

According to embodiments, the method further comprises at the end of the third predefined time frame reverting the additional configuration changes implemented by adapting the search configuration with the set of additional configuration parameter changes used at the start of the third predefined time frame. Embodiments may have the beneficial effect that after the expected event, the search configuration is set back to its initial state before the start of the respective predefined time frame. Thus, event specific modification of the search configuration may be implemented exclusively for the time frame to which the respective event is assigned.

According to embodiments, the method further comprises for each additional event of the sets of additional events calculating a fourth likelihood of an occurrence of the respective additional event within a fourth predefined time frame. The fourth predefined time frame follows the third predefined time frame, and, if the fourth likelihood exceeds the predefined threshold, at the end of the third predefined time frame in anticipation of the respective additional event the search configuration is automatically adapted using the set of additional configuration parameter changes of the additional configuration change, which is associated with the respective additional event.

Embodiments may have the beneficial effect of implementing a configuration change at the end of the third predefined time frame in anticipation of an event which is expected to occur next in the fourth predefined time frame following the third predefined time frame. Thus, rather than returning to the initial state before the start of the third predefined time frame, the search configuration may be changed further, in order to be adjusted to the event expected to occur next in the fourth predefined time frame.

According to embodiments, the computer program product further comprises computer-readable program code configured to implement any of the embodiments of the method for automatically adapting a search configuration of a search engine of a search service based on repeatedly occurring events described herein.

According to embodiments, the computer system further is configured to execute any of the embodiments of the method for automatically adapting a search configuration of a search engine of a search service based on repeatedly occurring events described herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set fourth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
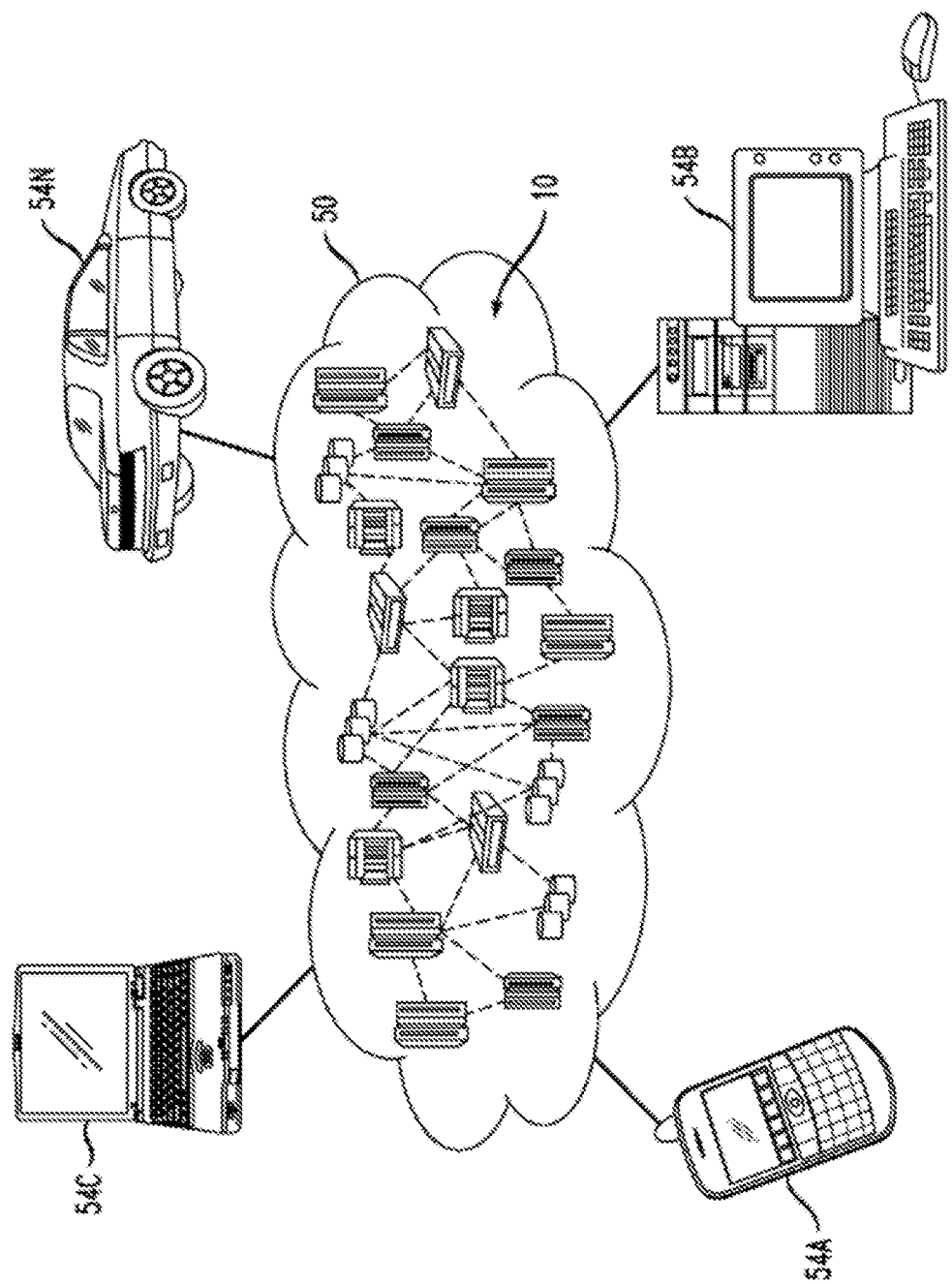
FIG. 2 depicts a schematic diagram illustrating an exemplary cloud computing environment according to an embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
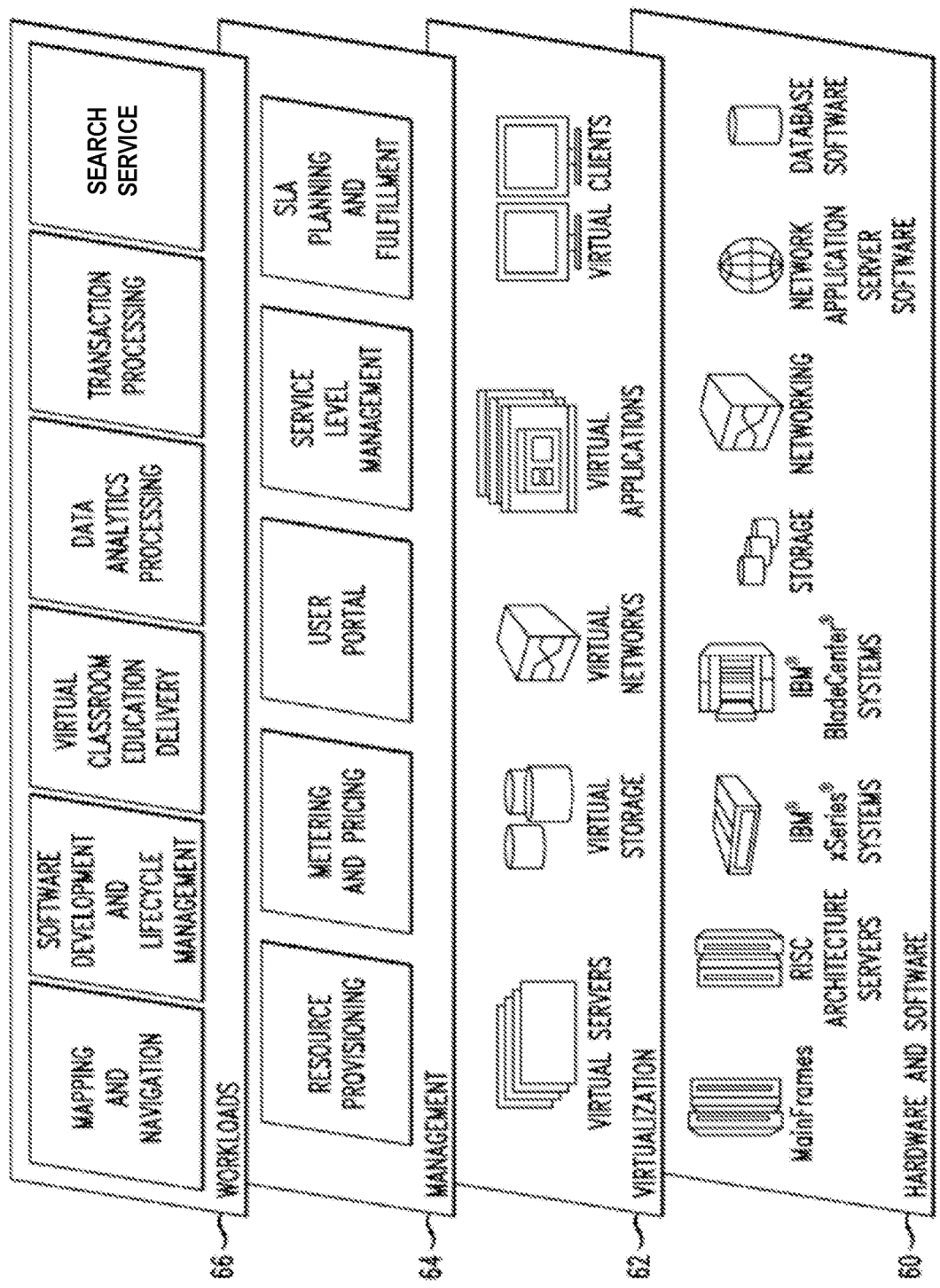
FIG. 3 depicts schematic diagram illustrating exemplary abstraction model layers according to an embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. For example, cloud storage locations, e.g. a virtual storage of virtualization layer 62, may be provided. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. For example, the identity of a user trying to access storage locations provided by the cloud infrastructure may be verified. User portal provides access to the cloud computing environment for consumers and system administrators, e.g. access to storage locations provided by the cloud infrastructure. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and providing a search service. The search service may be configured for automatically adapting a search configuration comprised by a search engine of the respective search service based on repeatedly occurring events.

Figure 4:
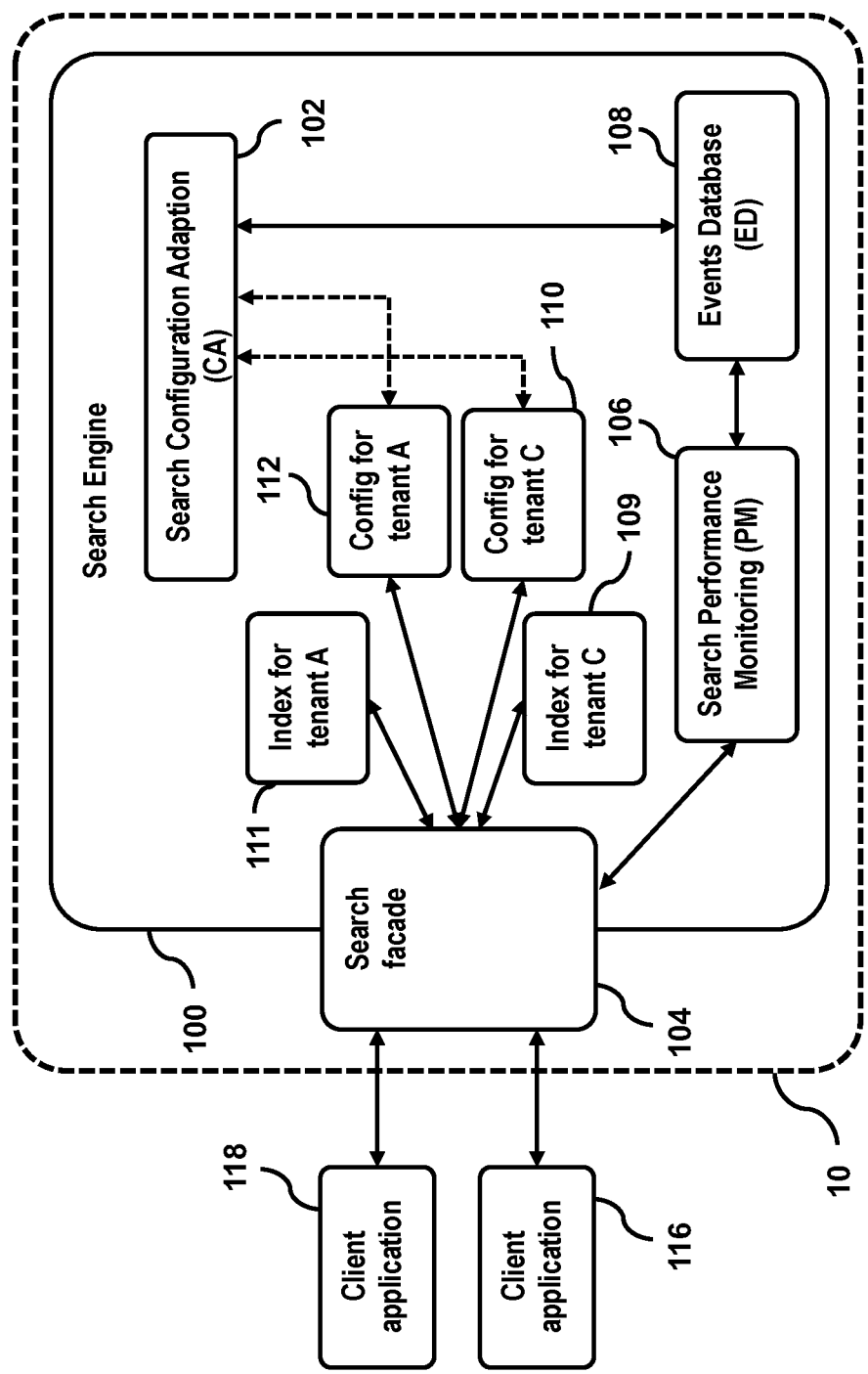
FIG. 4 depicts a schematic diagram illustrating an exemplary system for automatically adapting search configurations.

FIG. 4 depicts a schematic diagram illustrating an exemplary system for automatically adapting search configurations. The system may comprise a computer system, e.g. a cloud computing node 10, which provides a search engine 100 of a search service. The search engine 100 is an information retrieval software program, e.g. one of the program modules 42 of a cloud computing node 10, configured for information retrieval and presentation in response to search queries. The search service may further comprise a search façade 104 for receiving requests for searches to be executed by the search engine 100 form client applications 116, 118 executed e.g. on tenant computer systems. The requests may comprise search queries based on which the search is executed or the search engine 100 may generate the respective queries based on the request received. The search façade 104 may further evaluating access rights and ensure that that each tenant requesting a query only sees data assigned to the respective tenant and/or for which the respective tenant is assigned with access rights. The search service may comprise a plurality of tenant specific search configurations 110, 112. Based on the search configurations 110, 112 a plurality of tenant specific search indexes 109, 111 may be provided. Each of the tenant specific search indexes 109, 111 may for example be assigned to one of the tenant specific search configurations 110, 112, which defines how the respective search index 109, 111 is generated. Depending on which tenant requests a search, the search façade 104 may select one the search configurations 110, 112 assigned to the requesting tenant. The search is then executed by the search engine according to the request using the selected search configuration 110, 112 and the search index 109, 111 assigned to the selected search configuration 110, 112.

The search engine 100 may be extended by a search performance monitoring component 106. The search performance monitoring component 106 may be configured to monitor various performance indicators of searches executed by the search engine 100 using one of the search configurations 110, 122, like e.g. response-time, error rate, memory consumption and/or CPU consumption. To do so the performance monitoring component 106 may monitor requests received via the search façade 104 and may log queries and/or the throughput through the search façade 104. The monitored performance indicators may be used by the performance monitoring component 106 to generate time series and detect events using the time series. The detected events may each be assigned with a time frame and stored in an events database (ED) 108 for use by a configuration adaptation (CA) component 102. In addition, configuration changes applied to the search configurations 110, 112 may be monitored by the performance monitoring component 106 and stored in the ED 108, e.g. in combination with a timestamp. The CA component 102 may be configured to provide for each of the search configurations 110, 112 functionalities for analyzing the changes applied to the search configurations 110, determining associations between these search configuration changes and events stored in the ED 108 and automatically performing configuration changes in anticipation of events, if the respective event is expected to occur in a present time frame.

Figure 5:
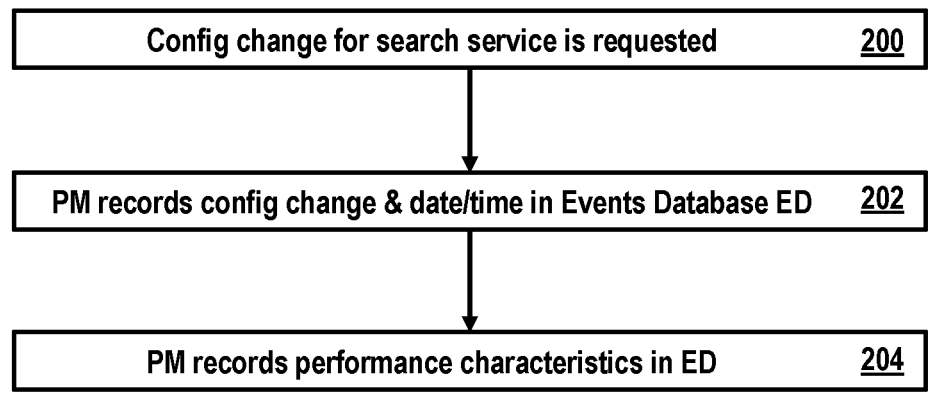
FIG. 5 depicts a schematic diagram illustrating an exemplary method for monitoring configuration changes and performance indicators.

FIG. 5 depicts a schematic flow diagram of an exemplary method for monitoring configuration changes and performance indicators. In block 200, a request for changing a search configuration of a search service is received. Multiple atomic configuration changes, each multiple configuration parameter changes, may be merged into one configuration change set, i.e. a set of configuration parameter changes. In block 202, the configurations changes are monitored and recorded by a search performance monitoring (PM) component. The configurations changes may be recorded in combination with a time and date of the implementation of the respective configurations change in am event database. In block 204, in addition to the configuration changes performance indicators of the search service executing searches using the search configurations may be recorded in the event database.

Figure 6:
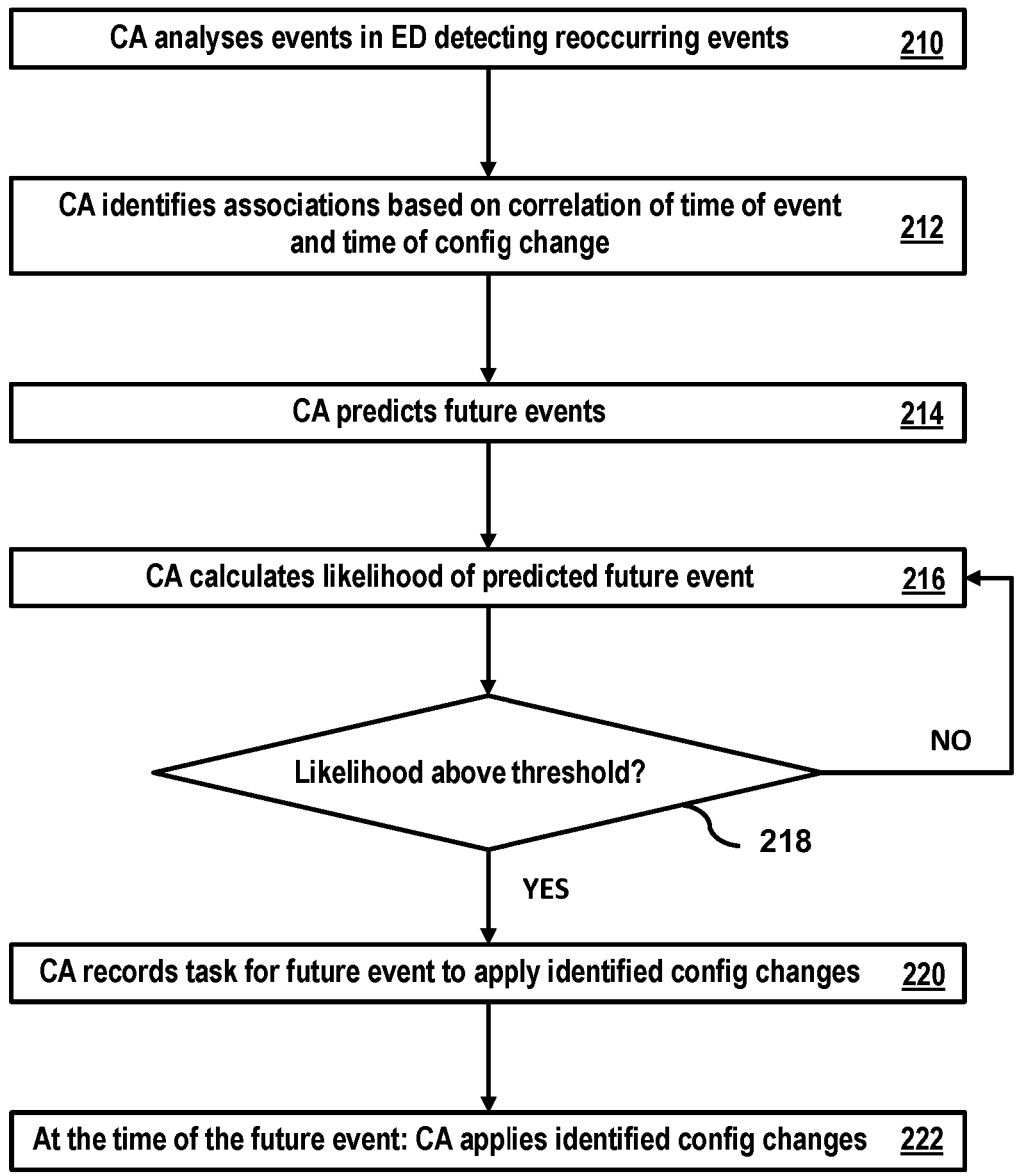
FIG. 6 depicts a schematic flow diagram of an exemplary method for automatically adapting search configurations.

FIG. 6 depicts a schematic flow diagram of an exemplary method for automatically adapting search configurations. In block 210, a configuration adaptation (CA) component analyses events stored in an events database (ED) and detects reoccurring events. The events stored in the ED may have been detected using time series of performance indicators. For example, phases of the time series data of monitored performance indicators representing an evolution over time of the respective performance indicators may have been separated, clustering and classifying in order to detect and identify the events. To detect such events occurred in the past, on a per tenant base or overall search service base, and predict a likelihood of their reoccurrence in the future, e.g. an autoregressive-moving-average model may be used. The detection of reoccurring events may for example comprise determining the number of occurrence and/or of a time pattern of the occurrences of events in the past. In block 212, the CA identifies associations between configuration changes and events based on a correlation of time of events and time of configuration changes. Multiple configuration changes executed at the same time frame as an event may be considered to be correlated with each other and associated with the respective event. Thus, using these associations for each of the events a set of one or more configuration changes associated with the respective event may be generated. In block 214, future events are predicted, i.e. reoccurring events which may occur again in the future ate identified. In block 216, for each future event a likelihood of occurrence for a tenant in a predefined time frame may be calculated using Bayesian statistics. In block 218, it is checked whether the calculated likelihood exceeds a predefined threshold. In case the predefined threshold is not exceeded, the method is continued with block 216 calculating a likelihood of occurrence for the next future event, until a likelihood of occurrence has been calculated for each of the future events. In case the predefined threshold is not exceeded, the method is continued with block 220, in which the CA records a task for the respective future event of applying the configuration changes associated with the respective event. In block 222, the search configuration is automatically adapting according to the set of configuration changes which are associated with the respective event. This adaption may take place at the start of a time frame for which the likelihood has been calculated and reverted at the end of the respective time frame.

It is understood that one or more of the aforementioned embodiments of the invention may be combined as long as the combined embodiments are not mutually exclusive. Ordinal numbers, like e.g. 'first' and 'second', are used herein to indicate different element assigned with the same name, but do not necessarily establish any order of the respective elements.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the 'C' programming language or similar programming languages. The computer readable program instructions may execute entirely on the user computer system's computer, partly on the user computer system's computer, as a stand-alone software package, partly on the user computer system's computer and partly on a remote computer or entirely on the remote computer or server. In the latter scenario, the remote computer may be connected to the user computer system's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for automatically adapting a search configuration of a search engine of a search service based on repeatedly occurring events, the search configuration being represented by a set of one or more configuration parameters, the method comprising:
    monitoring, by one or more computer processors, one or more configuration changes applied to a search configuration, wherein the search configuration is a set of one or more configuration parameters, each configuration change being defined by a set of one or more configuration parameter changes applied to one or more configuration parameters of the set of configuration parameters;
    generating, by one or more computer processors, a set of one or more time series of a set of one or more performance indicators of the search service using the search configuration, the generating of the set of one or more time series comprises monitoring, by one or more computer processors, the set of performance indicators;
    detecting, by one or more computer processors, a set of one or more events using the set of one or more time series of the set of performance indicators, each event of the set of one or more events being assigned to a time frame;
    determining, by one or more computer processors, a set of one or more associations, each association of the one or more associates being an association between an event of the set of events detected for the search configuration and a configuration change of the one or more configuration changes monitored for the search configuration;
    calculating, by one or more computer processors, for each event of the set of events a first likelihood of an occurrence of the respective event within a first predefined time frame; and
    in response to the first likelihood exceeding a predefined threshold, at a start of the first predefined time frame in anticipation of the respective event, adapting, by one or more computer processors, the search configuration using the set of configuration parameter changes of the configuration change, which is associated with the respective event.

2. The computer-implemented method of claim 1, the computer-implemented method further comprising at a end of the first predefined time frame reverting each of the configuration changes implemented by adapting the search configuration with the sets of configuration parameter changes used at the start of the first predefined time frame.

3. The computer-implemented method of claim 1, the computer-implemented method further comprising for each event of the set of events calculating, by one or more computer processors, a second likelihood of an occurrence of the respective event within a second predefined time frame, the second predefined time frame following the first predefined time frame, and
    in response to the second likelihood exceeding the predefined threshold, at a end of the first predefined time frame in anticipation of the respective event, adapting, by one or more computer processors, the search configuration using the set of configuration parameter changes of the configuration change, which is associated with the respective event.

4. The computer-implemented method of claim 1, wherein the predefined threshold is the same for all events.

5. The computer-implemented method of claim 1, wherein the predefined threshold is specific to each event.

6. The computer-implemented method of claim 1, wherein the step of detecting of the set of events comprising for each time series of the set of one or more time series comprises:
   determining, by one or more computer processors, one or more phases of the respective time series,
   clustering, by one or more computer processors, the one or more determined time series phases,
   classifying, by one or more computer processors, the one or more clustered time series phases.

7. The computer-implemented method of claim 1, wherein the one or more events are detected using an autoregressive-moving-average model.

8. The computer-implemented method of claim 1, wherein the first likelihood is calculated using Bayesian statistics.

9. The computer-implemented method of claim 1, wherein the configuration parameters are selected from the group consisting of: an indexing, a querying, a ranking, a data management and a memory management.

10. The computer-implemented method of claim 1, wherein the set of performance indicators are selected from the group consisting of: a response-time, an error rate, a memory consumption and a CPU consumption.

11. The computer-implemented method of claim 1, the computer-implemented method further comprising:
   providing, by one or more computer processors, one or more additional search configurations of the search engine, each additional search configuration being represented by a set of one or more additional configuration parameters;
   monitoring, by one or more computer processors, for each of the additional search configurations one or more additional configuration changes applied to the respective one or more additional search configuration, each additional configuration change being defined by a set of one or more additional configuration parameter changes applied to one or more of the set of one or more additional configuration parameters of the set of additional configuration parameters representing the respective additional search configuration;
   generating, by one or more computer processors, for each of the additional search configurations a set of one or more additional time series of the set of performance indicators of the search service using the respective additional search configuration, the generating of the set of additional time series comprising monitoring, by one or more computer processors, the set of performance indicators;
   detecting, by one or more computer processors, for each of the additional search configurations a set of one or more additional events using the set of additional time series of the set of performance indicators of the search service using the respective additional search configuration, each additional event being assigned to a second time frame;
   determining, by one or more computer processors, for each of the additional search configurations as set of one or more additional associations, each additional association being an association between an additional event of the set of additional events detected for the respective additional search configuration and an additional configuration change of the set of additional configuration changes monitored for the respective additional search configuration;
   calculating, by one or more computer processors, for each of the additional events of the set of additional events a third likelihood of an occurrence of the respective event within a third predefined time frame; and
   responsive to the third likelihood exceeding the predefined threshold, at the start of the third predefined time frame in anticipation of the respective additional event, adapting, by one or more computer processors, the search configuration using the set of additional configuration parameter changes of the additional configuration change, which is associated with the respective additional event.

12. The computer-implemented method of claim 11, wherein the third predefined time frame is identical to the first predefined time frame.

13. The computer-implemented method of claim 11, wherein the third predefined time frame is different from the first predefined time frame.

14. The computer-implemented method of claim 13, wherein the search configuration and the additional search configurations are each assigned to a different tenant.

15. The computer-implemented method of claim 13, wherein the additional search configurations are assigned to a same tenant as the search configuration.

16. The computer-implemented method of claim 13, the computer-implemented method further comprising at the end of the third predefined time frame, reverting, by one or more computer processors, the additional configuration changes implemented by adapting, by one or more computer processors, the search configuration with the set of additional configuration parameter changes used at the start of the third predefined time frame.

17. The computer-implemented method of claim 13, the computer-implemented method further comprising for each additional event of the sets of additional events calculating, by one or more computer processors, a fourth likelihood of an occurrence of the respective additional event within a fourth predefined time frame, the fourth predefined time frame following the third predefined time frame, and, if the fourth likelihood exceeds the predefined threshold, at the end of the third predefined time frame in anticipation of the respective additional event adapting, by one or more computer processors, the search configuration using the set of additional configuration parameter changes of the additional configuration change, which is associated with the respective additional event.

18. A computer program product for a user-driven adaptation of a ranking of navigation elements of a client application, the computer program product comprising:
   one or more computer readable storage media; and
   program instructions stored on the one or more computer readable storage media, the program instructions comprising:
      program instructions to monitor one or more configuration changes applied to a search configuration, wherein the search configuration is a set of one or more configuration parameters, each configuration change being defined by a set of one or more configuration parameter changes applied to one or more configuration parameters of the set of configuration parameters;

program instructions to generating a set of one or more time series of a set of one or more performance indicators of the search service using the search configuration, the generating of the set of one or more time series comprising monitoring the set of performance indicators;

program instructions to detect a set of one or more events using the set of one or more time series of the set of performance indicators, each event of the set of one or more events being assigned to a time frame;

program instructions to determine a set of one or more associations, each association of the one or more associates being an association between an event of the set of events detected for the search configuration and a configuration change of the one or more configuration changes monitored for the search configuration;

program instructions to calculate for each event of the set of events a first likelihood of an occurrence of the respective event within a first predefined time frame; and in response to the first likelihood exceeding a predefined threshold, at a start of the first predefined time frame in anticipation of the respective event, program instructions to adapt the search configuration using the set of configuration parameter changes of the configuration change, which is associated with the respective event.

19. A computer system for a user-driven adaptation of a ranking of navigation elements of a client application, the computer system comprising:

one or more computer processors;

one or more computer readable storage media; and program instructions stored on the one or more computer readable storage media for execution by at least one of the one or more computer processors, the program instructions comprising:

program instructions to monitor one or more configuration changes applied to a search configuration, wherein the search configuration is a set of one or more configuration parameters, each configuration change being defined by a set of one or more configuration parameter changes applied to one or more configuration parameters of the set of configuration parameters;

program instructions to generating a set of one or more time series of a set of one or more performance indicators of the search service using the search configuration, the generating of the set of one or more time series comprising monitoring the set of performance indicators;

program instructions to detect a set of one or more events using the set of one or more time series of the set of performance indicators, each event of the set of one or more events being assigned to a time frame;

program instructions to determine a set of one or more associations, each association of the one or more associates being an association between an event of the set of events detected for the search configuration and a configuration change of the one or more configuration changes monitored for the search configuration;

program instructions to calculate for each event of the set of events a first likelihood of an occurrence of the respective event within a first predefined time frame; and in response to the first likelihood exceeding a predefined threshold, at a start of the first predefined time frame in anticipation of the respective event, program instructions to adapt the search configuration using the set of configuration parameter changes of the configuration change, which is associated with the respective event.

20. The computer system of claim 19, wherein the predefined threshold is the same for all events.

\* \* \* \* \*